Figure 1:
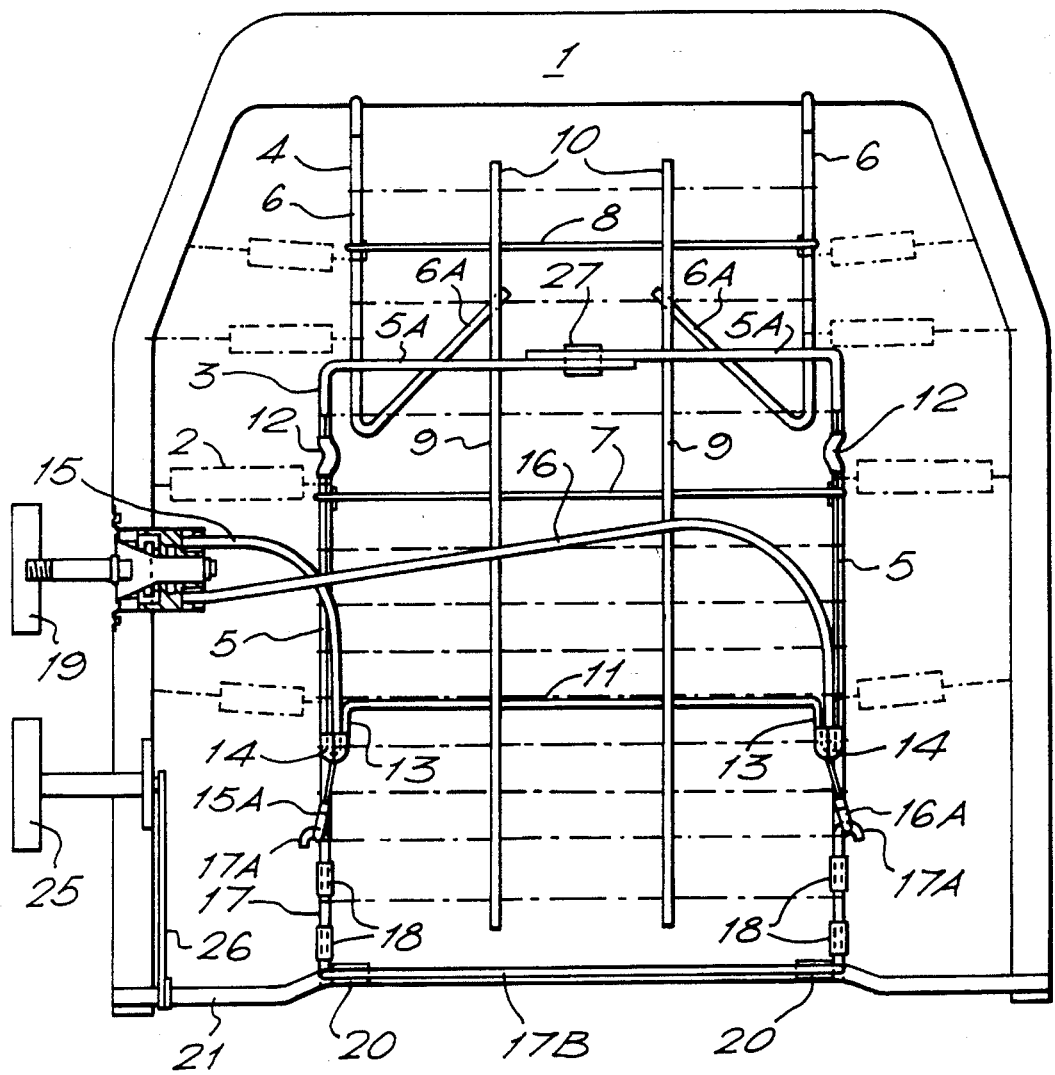

United States Patent [19]
Maeyaert

[11] Patent Number: 5,474,358
[45] Date of Patent: Dec. 12, 1995

[54] SEAT ARRANGEMENTS PROVIDING ADJUSTABLE LUMBAR SUPPORT

[75] Inventor: Eric Maeyaert, Heule, Belgium

[73] Assignee: Youngflex S.A., Fribourg, Switzerland

[21] Appl. No.: 170,322

[22] PCT Filed: Apr. 26, 1993

[86] PCT No.: PCT/GB93/00866

§ 371 Date: May 27, 1994

§ 102(e) Date: May 27, 1994

[87] PCT Pub. No.: WO93/21800

PCT Pub. Date: Nov. 11, 1993

[30] Foreign Application Priority Data

Apr. 29, 1992 [GB] United Kingdom ............... 9209229

[51] Int. Cl.$^6$ ............................................. A47C 25/00
[52] U.S. Cl. .............................. 297/284.7; 297/284.4
[58] Field of Search ........................ 297/284.7, 284.4

[56] References Cited

U.S. PATENT DOCUMENTS

| 2,756,809 | 7/1956 | Endresen | 297/284.7 |
| 4,632,454 | 12/1986 | Naert | 297/284.7 X |
| 5,217,278 | 6/1993 | Harrison et al. | 297/284.7 |

Primary Examiner—Laurie K. Cranmer
Attorney, Agent, or Firm—Jacobson, Price, Holman & Stern

[57] ABSTRACT

A seat back comprises a frame structure from which are resiliently suspended a first platform element and a second platform element that together provide support for the upholstery of the seat. The first platform element can be buckled to provide adjustable horizontal lumbar support. In addition, the lower margin of the platform element is coupled to a cranked shaft that can be adjustably rotated to vary the vertical position of the platform element in the frame structure. During such adjustment, the upper margin of the platform element (3) slides upon lateral rails of the upper platform element (4).

10 Claims, 2 Drawing Sheets

SEAT ARRANGEMENTS PROVIDING ADJUSTABLE LUMBAR SUPPORT

This invention concerns improvements in and relating to seat arrangements providing adjustable lumbar support. Such an arrangement is particularly adapted to a seat structure for use in an automobile, bus, minibus, train, office or furniture seat of the kind wherein a platform element providing support for the upholstery of the seat is resiliently suspended in a seat frame.

It is known, see for example EP 0 169 293, that an assembly for incorporation in a seat back to provide adjustable lumbar support may comprise a platform element adapted to be suspended in a seat frame to support the cushioning of a seat rest, said platform element including two elongate lateral rails between which extend transverse members that provide the platform support, adjustable means being linked between respective portions of each of said elongate rails to apply thereto a force of longitudinal compression, whereby said rails are caused to be arched outwardly in the lumbar region of the back rest together with the transverse members carried thereby.

Such an arrangement provides an adjustable and comfortable lumbar support which is of relatively simple design. It has the disadvantage, however, that although the degree of lumbar support can be readily adjusted in the horizontal direction, the vertical position at which lumbar support is provided is determined by the initial geometric shape of the platform element and the points at which the compression forces are applied to the lateral rails, so that it is impossible for an occupant of the seat to adjust the lumbar support in a vertical direction to meet individual requirements.

Other systems are available to provide for vertical adjustment of lumbar support, but these have the disadvantage, either that they are not adaptable to the particular arrangement initially referred to or that adjustment of the vertical and horizontal positions of the lumbar support are not fully independent of one another.

It is accordingly an object of the invention to provide, in a simple manner, a novel construction of seat back that enables both horizontal and vertical adjustment of lumbar support.

The invention accordingly provides a seat back comprising a frame structure from which is resiliently suspended a platform element for supporting upholstery of the seat, said platform element being linked to a first adjusting means for applying a force of longitudinal compression between points of the platform element spaced in a vertical direction, in order to cause resilience buckling of the platform element to arch outwardly in the lumbar region of the back rest, and said platform element being linked to a second adjusting means for effecting vertical displacement of said platform element relatively to the said frame structure.

Advantageously the said second adjusting means is coupled between the frame structure and a lower margin of the said platform element in such a manner that the said lower margin is fixed in its vertically adjusted position. Such an arrangement not only enables the construction of the second adjusting means to be mechanically simple, but also improves the effectiveness of the horizontal lumbar adjustment, since it reduces the tendency of the resiliently suspended platform element to become horizontally displaced to a greater extent by load on the seat back, when the platform element is arched to provide greater lumbar support.

According to one embodiment of the invention, the platform element providing the adjustable lumbar support may be supplemented by a second resiliently suspended platform element located in the upper region of the back rest, the arrangement being such that the further platform element provides support for the upper horizontal margin of the first platform element, whilst accommodating relative sliding motion of the first platform element under the influence of the second adjusting means.

The platform element or platform elements may advantageously be of the kind comprising a wire grid, wherein transverse supporting wires are tensioned between lateral rails that are in turn coupled to the frame structure by tension springs.

Figure 2:
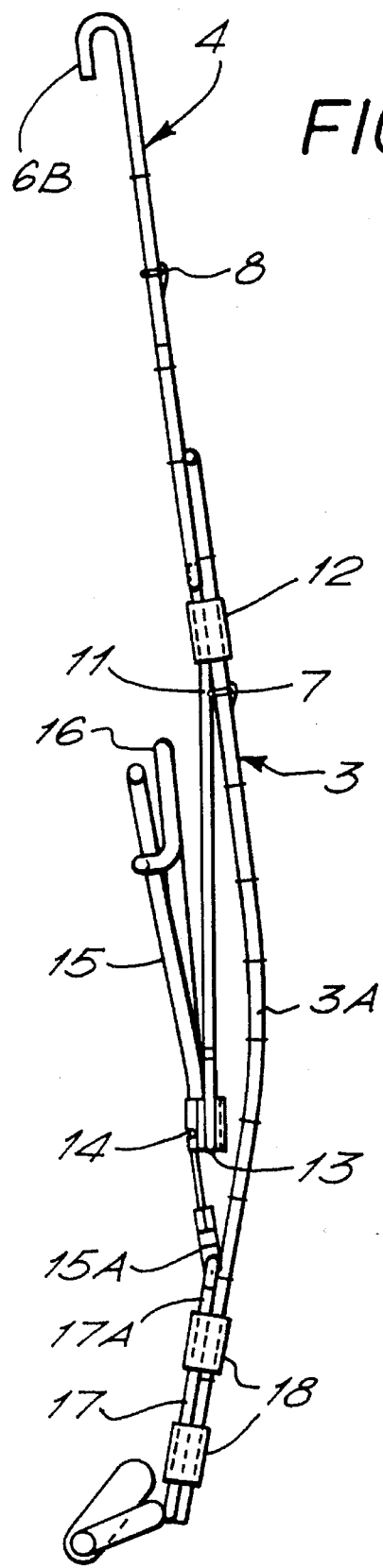
Figure 3:
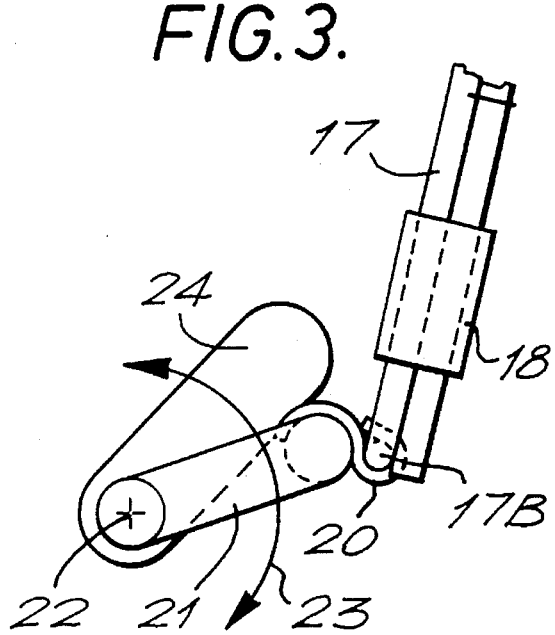

Further preferred features and advantages of the invention will become apparent from the following description of one exemplary embodiment of the invention that is illustrated in the accompanying drawings, in which:

FIG. 1 is a front elevation of a back rest of a vehicle seat incorporating an arrangement in accordance with the invention, FIG. 2 is a side elevation of a platform assembly of the arrangement illustrated in FIG. 1, and FIG. 3 is an enlarged fragmentary view of a part of FIG. 2.

Referring to the drawings, the reference numeral 1 illustrates the frame of a seat back for an automobile seat. The seat is illustrated with the upholstery removed, and, suspended within the frame 1 by means of tension springs illustrated in broken lines at 2, are transversely extending platform elements 3 and 4 that provide support for the upholstery of the seat.

In known manner each of the platform elements comprises a wire grid consisting of lateral rails 5 or 6 formed by steel cords that are paper-wrapped or coated with synthetic plastics material, between which are tensioned transverse wires 7 or 8 penetrating intermediate tubes 9 or 10 of synthetic plastics material. For clarity only one of the transverse wires 7 or 8 are shown in full lines in the drawings, the positions of the remaining wires being indicated in broken lines.

A sub frame 11 of formed wire is secured to the side rails 5 of the platform element 3 by means of clips 12. The sub frame 11 is formed to include U-shaped loops 13, within which are anchored synthetic plastics blocks 14 forming ferrules for the connection of a pair of Bowden cables 15 and 16 respectively.

A further sub frame 17 of formed wire is anchored to the lower ends of the rails 5 of the platform element 3 by means of clips 18.

The Bowden cables 15 and 16 are linked to a common actuating mechanism 19 mounted on the frame 1, and inner cables 15A and 16A of the Bowmen cables 15 and 16 are anchored at their ends to hooked portions 17A of the sub frame 17.

A centre section 17B of the sub frame 17 forms a bottom rail for the platform element 3 and is linked by means of clips 20 to a cranked shaft 21, as indicated more clearly in FIG. 3. The shaft 21 is pivoted in the frame 1 about an axis 22 (FIG. 3) and can be pivoted to an arc indicated by the arrow 23 in FIG. 3 via a lever 24 coupled to a manual actuating means 25 located in the frame 1, by means of a connecting rod 26.

The upper ends of the two lateral rails 5 have portions 5A bent at right angles and are clipped together by means of a clip 27 to form an upper horizontal margin of the platform element 3. The lower ends of the rails 6 are turned inwards at an acute angle at 6A and rest upon an appropriate transverse wire 8 in order to provide support for the portions 5A forming the upper margin of the platform element 3. The upper ends of the rails 6 are hooked at 6B (FIG. 2) and engage in apertures in a flange (not illustrated) of the frame 1.

Upon actuation of the actuating means 19 to contract the Bowden cables 15 and 16, the two sub frames 11 and 17 are drawn together by tension exerted between the loops 14 and the hooked portions 17A, so that an intermediate portion 3A (FIG. 2) of the sub frame 3 is caused to arch outwardly in order to adjust the horizontal position of the lumbar support provided by the platform 3. Upon operation of the actuating means 19 to relax the Bowden cables 15 and 16, the platform element 3 will tend to return to its original condition, under the influence of the tension springs 2, its own inherent resilence, and load upon the seat.

By manual operation of the actuating means 25, the cranked shaft 21 can be rotated to raise or lower the position of the lower margins 17B of the platform element 3. The vertical position of the lumbar support provided by the portion 3A of the platform element 3 can thus be correspondingly adjusted. Vertical movement of the platform element 3 is accommodated by corresponding movement of the tension springs 2 and by flexing of the Bowden cables 15 and 16. The upper margin of the platform element 3 slides upon the rails 6,6A of the upper platform element 4, the, preferably, plastics coating of the steel cords serving to reduce friction and avoid the generation of noise.

It will be appreciated that the arrangement as described provides a simple and effective means of obtaining both horizontal and vertical adjustment of lumbar support. The fact that the platform element 3 is adjustably located in a fixed position at its lower margin 17B enables a simple lever actuated adjustment mechanism to be adopted whilst also providing for positive location of the arched lumbar support in the horizontal direction, so that the tendency for the lower edge of the platform element 3 to be displaced under load is eliminated. The provision of the additional platform element 4, fixed at its upper end, avoids disturbance of the position of the upholstery in the upper section of the seat back as the vertical position of the platform element 3 is adjusted, whilst also enabling a more consistent spring suspension of the upper margin of the platform element 3 through a vertical range of movement.

Various alterations and modifications may be made to the illustrated embodiment without departing from the scope of the invention. Thus, although separate manual actuating means 19 and 25 are illustrated for the provision of horizontal and vertical lumbar support, the two controls could be combined in a single unit, for example as two-part knob, or in an electrically driven actuating means. Although the actuating means are illustrated as being mounted upon the frame 1, the manual controls may be remotely located at any desired position.

I claim:

1. A seat back comprising a frame structure from which are resiliently suspended a first platform element for supporting upholstery of the seat in a lower region of said seat back and a second platform element for supporting upholstery of the seat in an upper region of said seat back, said first platform element being linked to a first adjusting means for applying a force of longitudinal compression between points of the platform elements based in a vertical direction, in order to cause resilient buckling of the first platform to arch outwardly in the lumbar region of the back rest, whereby lumbar support provided by said first platform element can be varied in a horizontal direction, and said first platform element is linked to a second adjusting means for effecting vertical displacement of said first platform element relative to the said frame structure, whereby lumbar support can be varied in a vertical direction, an upper end of said first platform element slidably engaging over a lower end of said second platform element.

2. A seat back according to claim 1 characterised in that said second adjusting means is coupled between the frame structure and a lower margin of the said first platform element.

3. A seat back according to claim 2, characterised in that said second adjusting means comprises a shaft journalled at its ends in the frame structure and having an eccentric intermediate portion pivotally coupled to said lower margin of the said first platform element.

4. A seat back according to claim 3, wherein the platform element comprises a wire grid, wherein transfer supporting wires are tensioned between lateral rails that are coupled to the frame structure by tension springs.

5. A seat back according to claim 4, wherein the platform element has lateral rails and an upper margin, the lateral rails being interconnected at their upper ends to form a transverse rail at the upper margin of the platform element that can slide against lateral rails of a second platform element.

6. A seat back according to claim 5, wherein the lateral rails of the second platform element have obliquely angled interned ends to provide additional support for said transverse rail.

7. A seat back according to claim 1, characterised in that the platform elements each comprise a wire grid, wherein transverse supporting wires are tensioned between lateral rails that are in turn coupled to the frame structure by tension springs.

8. A seat back according to claim 7, characterised in that the lateral rails of the first platform element are interconnected at their upper ends to form a transverse rail at the upper margin of the platform element that can slide against the lateral rails of the second platform element.

9. A seat back according to claim 8, characterised in that the lateral rails of the second platform element have obliquely angled inturned ends to provide additional support for the transverse rail of the first platform element.

10. A seat back having a lumbar region and comprising a frame structure from which is resiliently suspended a platform element for supporting upholstery of the seat, said platform element being linked to a first adjusting means for applying a force of longitudinal compression between points of the platform element spaced in a vertical direction, in order to cause resilient buckling of the platform element to arch outwardly in the lumbar region, said platform element being linked to a second adjusting means for effecting vertical displacement of said platform element relative to said frame structure, the second adjusting means being coupled between the frame structure and a lower margin of said platform element, comprising a shaft journaled at its ends in the frame structure and having an eccentric intermediate portion pivotally coupled to said lower margin of said platform element.

* * * * *